Sept. 29, 1970    O. R. ACHABAL ET AL    3,531,008
SAFETY CLOSURES FOR CONTAINERS
Filed Jan. 2, 1969    3 Sheets-Sheet 1

INVENTORS
OSCAR R. ACHABAL
EDWARD SCHMIDT
MIROSLAV UROSHEVICH

BY George A. Schwenger
ATTORNEY

INVENTORS
OSCAR R. ACHABAL
EDWARD SCHMIDT
MIROSLAV UROSHEVICH

BY *George A. Schwenzer*
ATTORNEY

Sept. 29, 1970     O. R. ACHABAL ET AL     3,531,008

SAFETY CLOSURES FOR CONTAINERS

Filed Jan. 2, 1969     3 Sheets-Sheet 5

INVENTORS
OSCAR R. ACHABAL
EDWARD SCHMIDT
MIROSLAV UROSHEVICH

BY George A. Schwenger
ATTORNEY

United States Patent Office 3,531,008
Patented Sept. 29, 1970

3,531,008
SAFETY CLOSURES FOR CONTAINERS
Oscar R. Achabal, Edward Schmidt, and Miroslav Uroshevich, Hamilton County, Ohio (all of 2230 Kroger Bldg., 1014 Vine St., Cincinnati, Ohio 45202)
Filed Jan. 2, 1969, Ser. No. 797,316
Int. Cl. A61j 1/00; B25d 55/02
U.S. Cl. 215—9                           18 Claims

ABSTRACT OF THE DISCLOSURE

This invention discloses a safety closure means for containers having threaded or rotatable sealing caps. It comprises an inner sealing cap and an outer cap adapted to longitudinal movement in relation to the sealing cap adapted to be rotated independent of the sealing cap, and to be rotated together as a unit with the sealing cap during removal or replacing the sealing cap on the containers; together with radial projecting means to inhibit the separation of the outer cap from the sealing cap during pushing and pulling action to position the outer cap longitudinally in relation to the sealing cap.

BACKGROUND OF THE INVENTION

Many containers for noxious materials in liquid and crystalline form are kept in and dispensed from containers having rotatable closing and sealing means. Many of the present safety caps are called child proof. Most of the devices are not only complex with a multiple of parts and springs but require considerable strength and muscular power or unusual dexterity to accomplish their objectives. This not only makes them child proof but they are also proof against accidental opening by the aged and any one afflicted with arthritis and unable to apply sufficient necessary muscular power to make them function as safety caps.

Our invention provides a closure consisting of only two elements and overcomes the objectional difficulties encountered in other devices by arthritic, aged and other afflicted persons and it does at the same time provide a child proof, difficult to remove, closure means. This is accomplished by a combination of tasks to be performed and application of modest force within the capacity of a child to prevent a child or any person from opening a container accidentally. In operation our sealing means requires muscular power beyond the range of infants and small children to operate and it also requires a knowledge of the sequence of actions necessary to remove or replace a sealing cap.

Our invention has for its object a means to remove and secure sealing caps on containers; said means being complex and requiring a combination of tasks to be performed in order to make the caps difficult to remove with a minimum of muscular power and thereby make them child proof and secure them from accidental and thoughtless removal.

Another object of our invention is to provide a closure means that requires two step manipulation of the closure means to insure against easy or accidental removal of the closure means.

Another object of our invention is to provide a closure means for a container that requires concentrated thought to manipulate the elements of the closure means into a positive relationship before a sealing means of the closure means can be removed or replaced on the container.

A further object is to provide a safety closure means comprising an outer cap and an inner sealing cap adapted to rotate in relation each to the other in one position, and rotatable as a unit in another position and integral means on said outer cap to inhibit the disengagement of said caps when being slid longitudinally one to the other.

Another object of our invention is to provide explosion proof safety closure means to be used in cases when an explosive matter is stored in the container and to prevent the spraying of matter when the matter is explosively released from the container.

These and other objects will become apparent to those skilled in the art as disclosed by the specification and drawings comprising this application.

IN THE DRAWINGS

Figure 1:
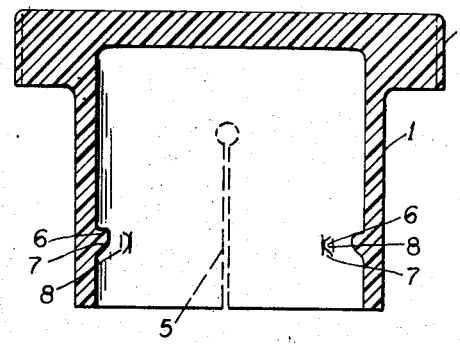
FIG. 1 is a sectional view taken on the vertical plane through the center of an outside cap.
Figure 3:
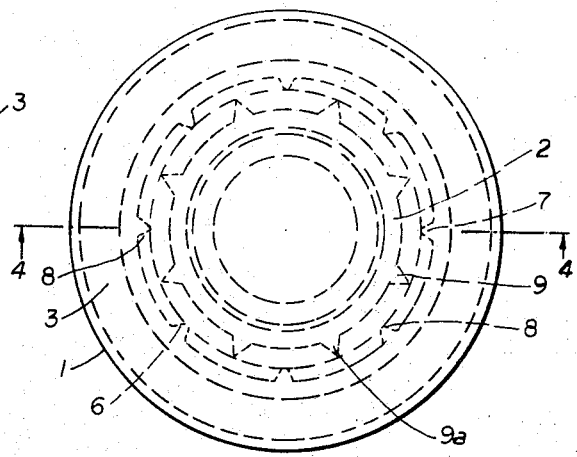
FIG. 3 is a top plan view of the closure means with the outside cap in place over the inside cap.
Figure 2:
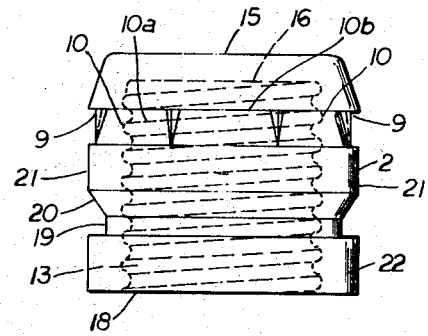
FIG. 2 is a side view in elevation of an inside cap and sealing means for a container.
Figure 4:
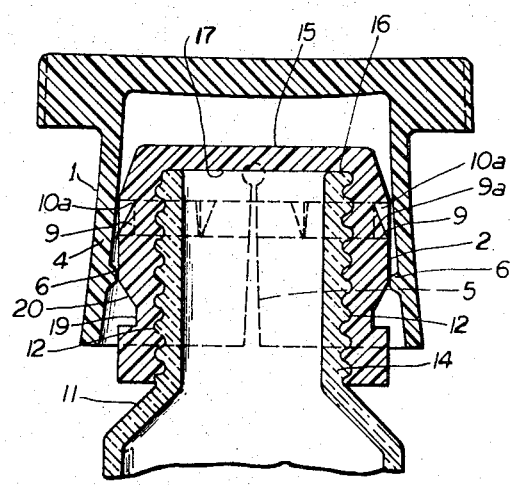
FIG. 4 is a sectional view in elevation taken on line 4—4 of FIG. 3 in mid-way position.
Figure 13:
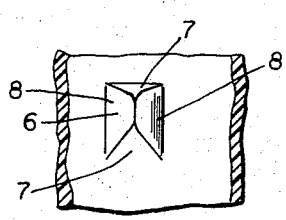
FIG. 13 is an enlarged fragmentary perspective view of a spaced finger 6.
Figure 14:
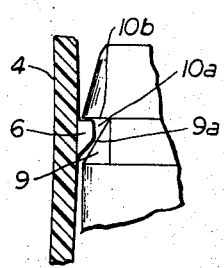
FIG. 14 is a fragmentary section showing a finger in an upper groove on the sealing cap.
Figure 5:
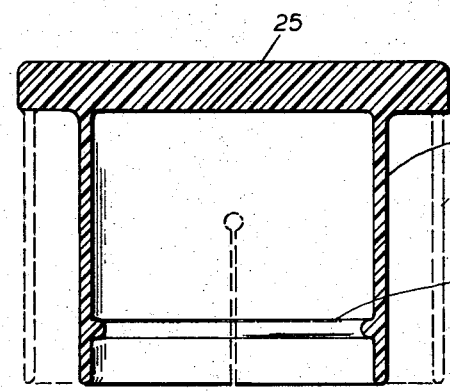
FIG. 5 is a sectional view of a modified form of an outer cap.
Figure 7:
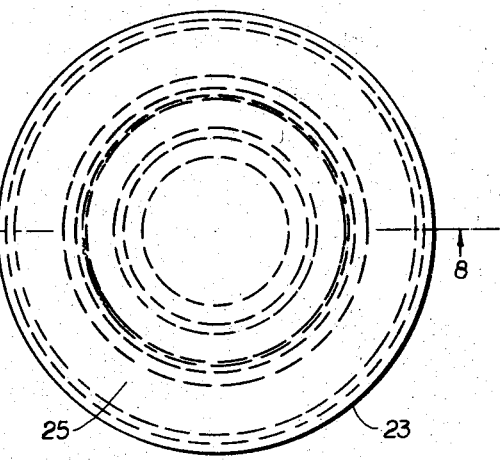
FIG. 7 is a top plan view showing the modified caps in FIGS. 5 and 6 in assembly.

Referring to FIGS. 1, 2, 3 and 4 the closure means comprises an outside cap 1 and an inside sealing cap 2. The caps are generally circular in form and made of flexible materials i.e. polyethylene. The outside cap is adapted to slide longitudinally up and down in relation to the inside sealing cap and also to cover over the inside sealing cap.

The outside cap has a top 3 with serrations around its perimeter for hand gripping and to facilitate the turning of the cap by the hand. The shape of the top 3 is also adapted to hand grip for push-pull action. Depending from and fixed to the top there is a tubular skirt 4 which in the preferred form is made of pliable material. This tubular skirt can be made to extend downward far enough so that the inner cap will never be exposed or seen. Slots 5 are provided in the tubular skirt when the tube is made of less pliable material and these slots allow the tubular skirt to expand when the outside cap is depressed down or raised in relation to the inside sealing cap. Adjacent to the bottom of the tubular skirt 4 there is one or more spaced fingers 6 that are fixed in the interior of the tubular skirt. The fingers have curved surfaces 7 with flat sides 8 at an angle for full engagement with flat sides of spaced ribs 9 that are fixed in an upper annular groove 10 in the inside sealing cap. The curved surfaces 7 facilitate the movement of the fingers 6 in and out of the annular groove 10 and another groove to be explained. When the fingers 6 are in engagement with ribs 9 the inside sealing cap is rotated by the outside cap which provides a wrench to remove from or to replace the sealing cap on a container 11 which has external male threads 12 on the neck of the container. While we have illustrated a threaded container any other type of rotatable securing means for a cap can be utilized.

The inside sealing cap 2 is generally cylindrical in form and has internal female threads 13 to match and be screwed on the male threads 12 on an open neck 14 of the container 11.

The inside sealing cap has a top 15 with a bottom 16 adapted to seat on a top 17 of the open neck 14 of the container to seal the container and to prevent the material from leaking from the container.

Adjacent to a bottom 18 of the inside sealing cap there is another annular groove 19 having a tapered side 20 terminating at an outside surface 21 of the inside sealing cap. This tapered surface enables the fingers 6 to enter and leave the annular groove 19 when the outside cap is lowered or raised in relation to the inside sealing cap. When the finger or fingers are in the annular groove 19 the outside cap then in a down position will rotate freely and independent of the inside sealing cap and will not rotate or disturb the inside sealing cap thereby leaving the container in a sealed condition.

When it is desired to remove or replace the inside sealing cap from the container the outside cap is moved upward in relation to the inside sealing cap until the fingers 6 drop into and are free floating in the upper annular groove 10 after which they are brought into contact with the spaced ribs 9 thereby forming a gripping means between the two caps. The ribs 9 are semi-pyramidally shaped having an upwardly and inwardly sloping edge 9a which prevent the fingers from sliding up and out of the annular groove 10 while pulling the outer cap upward. The inwardly sloping edge insures that the fingers will position themselves in the annular groove 10 and the fingers cannot be pulled from out of the annular groove 10 after initial assembly of the two small caps. The fingers, while in this position in the annular groove, are free to be moved into contact with the ribs 9. The top of the inwardly sloping edge provides a pocket 10a and an upper surface 10b in the annular groove provide a stop for the fingers 6 which hook and limit the upward movement of the outer cap. Rotating the outside cap with its fingers 6 in the upper groove 10 in contact with the ribs 9 will cause the inside sealing cap to be rotated until it is removed from the container. In order to replace the inside sealing cap on the container the fingers 6 and ribs 9 are kept in contact by keeping the outside cap in an up position in relation to the inside sealing cap. The sealing cap is then screwed on by turning it on the threads by means of a hand grip 3 at the upper end of the outside cap. When the inside sealing cap is seated, it is wrenched tighter by the aid of the outside cap because the fingers in contact with the ribs will rotate the inside sealing cap. Advantage of the use of the outside cap is gained because of the increased leverage due to the larger diameter of the top of the outside cap.

When the inside sealing cap is in sealing position on the neck of the container the outside cap is depressed to the down position until the fingers 6 engage in the annular groove 19. When the outside cap is in the down position the inside sealing cap cannot be removed because the outside cap is free to rotate in relation to the inner sealing cap.

A novel feature of our invention rests in the fact that there are only two units forming our safety cap. To open a container the two caps must be properly positioned one to the other and until they are properly positioned the container cannot be opened intentionally or accidently. The resistance to upward movement of the cap is such that a child cannot move it but normal adults or arthritic afflicted persons can do so. The upward pull moves the outer cap upward until the fingers 6 snap into the upper groove and come into contact with the ribs 9 for the opening position. The fingers 6 are so constructed so that they will not allow them to readily leave the groove during the upward pull thus preventing the two caps from becoming separated.

Referring to FIGS. 5, 6, 7 and 8 a modified form of our safety cap is illustrated. It comprises a slidable and rotatable outer cap 23 and an inner sealing cap 24. The outer cap has a top 25 secured to a depending tubular skirt portion 26 that slides up and down over the inner sealing cap when the outer cap is pulled up or pushed down in relation to the inner sealing cap. Adjacent the bottom of the tubular skirt portion there is an annular bead 27 adapted to be slidably and rotatably secured in annular grooves 28 on the inner sealing cap. The outer cap is free to be rotated independent of the inner sealing cap. When the outer cap is made from very pliable material a secondary tubular skirt portion (shown in dotted lines) is provided to prevent pressure on the tubular portion 26 to make frictional engagement between the tubular skirt portion 26 and the inner sealing cap.

Figure 6:
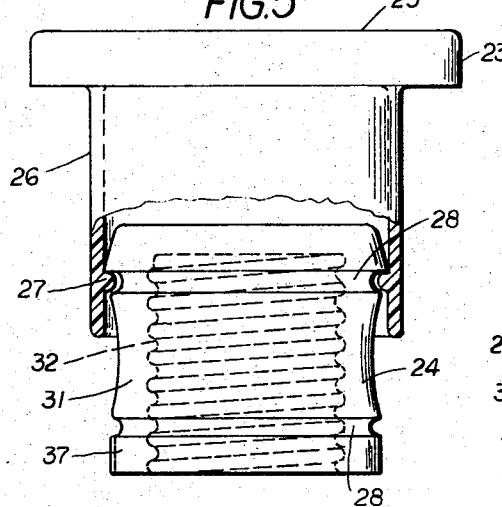
FIG. 6 is a side view of a modified inner sealing cap with the outer cap in FIG. 5 attached to the inner sealing cap.
Figure 8:
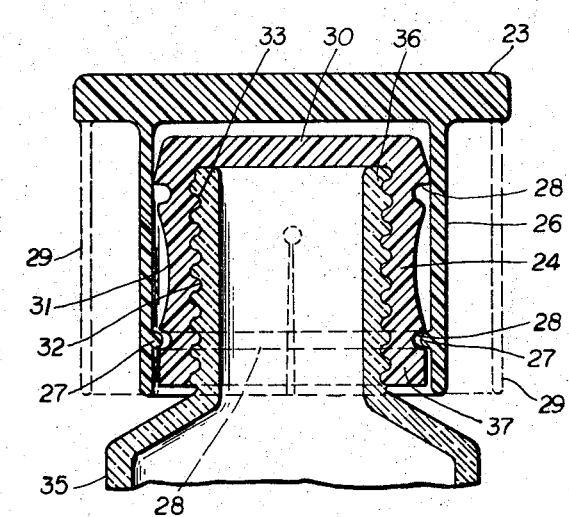
FIG. 8 is a sectional elevation of a fragmentary assembly of the modified caps in FIGS. 5 and 6 attached to and sealing a container.

The inner sealing cap has to top 30, for sealing a container, secured to a tubular body 31. Internally of the body there are female threads 32 adapted to be screwed onto male threads 33 exterior of a neck 34 of a container 35. When the bead 27 on the outer cap is in the upper or the lower groove 28 on the inner sealing cap the outer cap is free to rotate freely and independent of the inner sealing cap and will not rotate the inner sealing cap. Adjacent the bottom end 36 of the inner sealing cap there is a hand grip portion 37 which is exposed when the outer cap is in the up position as illustrated in FIG. 6. With the outer cap in the up position the inner sealing cap can be removed or replaced on the container by hand grip and turning the inner sealing cap. In FIG. 8 the outer cap is in the down position and it covers the inner sealing cap which cannot be turned to remove it from the container. In the down position the outer cap is turned freely but does not rotate the inner sealing cap.

Figure 12:
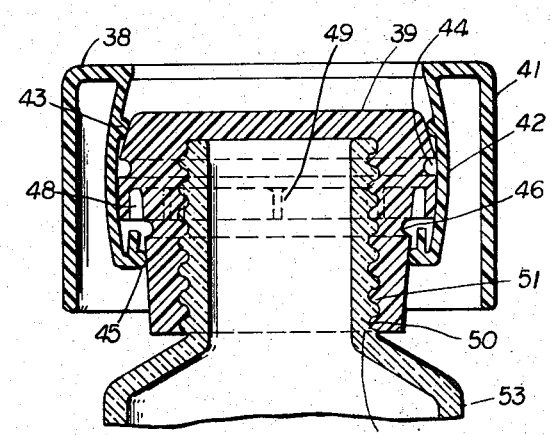
FIG. 12 is a sectional elevation of a fragmentary assembly of the modified caps in FIGS. 9 and 10 attached to and sealing a container.

Referring to FIGS. 9, 10, 11 and 12 there is illustrated another modified form of safety sealing cap. In this form there is an outer cap 38 and an inner sealing cap 39. Secured to a top 40 there is a spaced outer tubular portion 41 and spaced downward depending flexible bead and hook supports portions 42. The outer tubular portion prevents pressure from being applied on the inner portions 42 when the outer tubular portion is grasped by a hand. The outer tubular portion can be made of such a length so as to completely cover the inner cap and prevent the inner cap from being grasped by the hand at all times. Internal beads 43 are secured on the inside of the inner members 42 and they are adapted to be slidably rotated in a groove 44 around an outer circumference of the inner sealing cap. When the beads 43 are in groove 44 the outer cap is freely rotatable and will not turn the inner sealing cap. Adjacent the bottom of the inner members 42 there are other beads 45 fixed interior of the members 42 and adapted to snap into another groove 46 on the inner sealing cap. Upward projecting spaced hooks 47 are secured to the beads 45 and are adapted to be inserted in an annular cavity 48 approximately centrally located vertically on the outer periphery of the inner sealing cap. The hooks 47 are adapted to contact ribs 49 that are secured in the annular cavity 48 and are the means for rotating the inner sealing cap by rotation of the outer cap when it is in an up position in relation to the inner sealing cap. Conversely the inner sealing cap cannot be rotated when the hooks are out of the cavity as shown in FIG. 12. The inner sealing cap has female threads 50 for screwing the inner sealing cap on male threads 51 on a neck 52 of a container 53.

Figure 15:
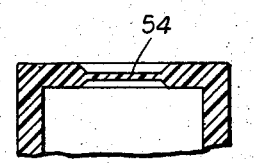
FIG. 15 is a diagrammatic illustration of the inner cap having a reduced central portion area for relieving excessive internal pressure.

For containers containing volatile materials that produce internal pressures a central portion 54, FIG. 15 in the top of the sealing cap is reduced in thickness to withstand up to explosive pressures. When pressure exceeds a certain amount this reduced section acts as a relief valve giving away and allowing slow leakage and thereby avoiding any spontaneous explosion.

Figure 16:
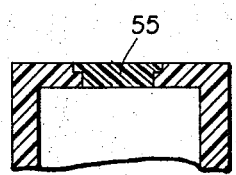
FIG. 16 is a schematic illustration of an inner cap with a blow out plug to relieve excessive internal pressure within the container.
Figure 9:
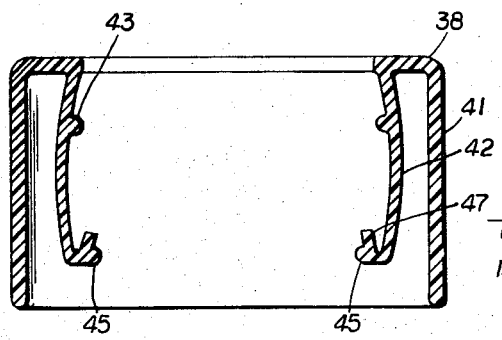
FIG. 9 is a sectional view showing another modified form of an outer cap.
Figure 11:
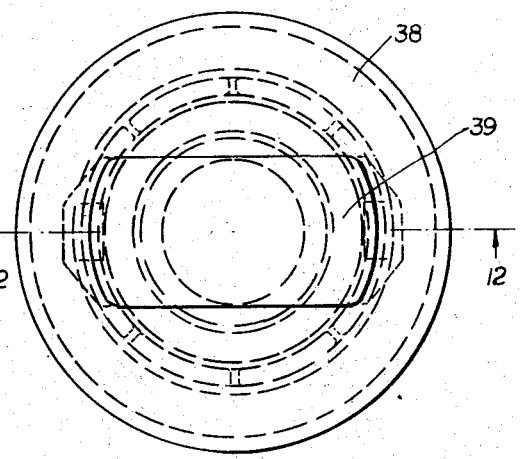
FIG. 11 is a top plan view showing the modified caps in FIGS. 9 and 10 in assembly.
Figure 10:
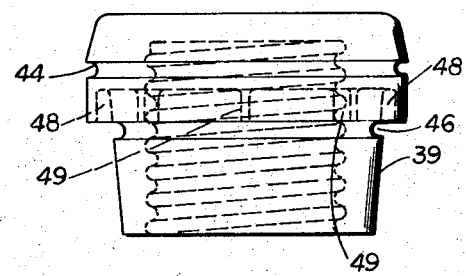
FIG. 10 is a side view of another modified inner sealing cap.

Another form of relief valve is a plug 55, FIG. 16. This plug is press fitted into the inner sealing cap and prevents spontaneous explosion. When the material in the container leaks through the relief valve, it will be prevented from spraying about by the outer cap.

Having thus described our invention we claim:

1. A safety cap for sealing the neck portion of a container which includes external screw threads, said safety cap comprising:
    an inner sealing cap having internal screw threads adapted to provide a threaded engagement with respect to the external screw threads of the neck portion of the container;
    said inner sealing cap having a top closure engageable with the open end of the neck of the container;
    an outside closure cap having a top closure and having a tubular skirt portion telescopically interfitted upon the outside diameter of the said inner sealing cap and being shiftable longitudinally with respect to the inner sealing cap;
    the tubular skirt of said outer closure cap being expansible with reference to the outside diameter of the inner sealing cap;
    a series of fingers spaced apart from one another and projecting inwardly from the inside diameter of the tubular skirt of the outer closure cap at the lower portion of the said tubular skirt;
    a series of spaced ribs within a groove adjacent the top of said inner sealing cap projecting outwardly from the top groove;
    said spaced internal fingers of the tubular skirt of the outer closure cap being engageable with the spaced ribs of the internal sealing cap when the closure cap is shifted upwardly with respect to the inner sealing cap, thereby permitting the inner sealing cap to be rotated with respect to the screw threads of the neck portion of the container;
    the inner sealing cap having an external groove formed in the lower portion thereof;
    the said spaced fingers of said skirt being engageable within said groove in the lower portion of said inner cap upon being forced longitudinally downwardly and thereby disengaging the fingers with reference to the said ribs and permitting an outer closure cap to be rotated with reference to the inner sealing cap;
    said fingers adapted to limit the longitudinal movement of said outer cap in relation to said inner sealing cap.

2. A safety cap for sealing the neck of a container as set forth in claim 1, and;
    an outer cap having a secondary tubular skirt to prevent pressure between said skirts adapted to be rotatably secured over and around said inner sealing cap to actuate said inner sealing cap on to and from the sealing of said open end neck portion of said container;
    said outer cap adapted to completely cover said inner sealing cap when said outer cap is in up or down positions over said inner sealing cap.

3. A safety cap as set forth in claim 1, and;
    said outer cap with said secondary tubular skirt adapted to be moved longitudinally upward and downward in relation to said inner sealing cap, and;
    said outer cap adapted to be rotated without rotating said inner sealing cap when said outer cap is in a lowered downward position over and around said inner sealing cap, and;
    said outer cap adapted to rotate said inner sealing cap when said outer cap is raised to an upward position in relation to said inner sealing cap and said inner sealing cap remaining completely covered by said outer cap when said outer cap is in an upward position.

4. A safety cap as set forth in claim 1, and;
    said outer cap having an outer tubular skirt and an inner tubular skirt formed of resilient materials;
    said outer cap having a slot in an inner tubular skirt to permit said inner tubular skirt to expand when said outer cap is moved longitudinally in relation to said inner sealing cap, and;
    said fingers adapted to be horizontally and movably secured in said upper annular groove and inhibited from further upward movement out of said upper annular groove.

5. A safety cap as set forth in claim 1, and;
    said outer cap having a tubular skirt formed of resilient material, and;
    said outer cap having a slot to permit said outer cap to expand when said outer cap is moved longitudinally in relation to said inner sealing cap, and;
    said fingers in said outer cap adapted to engage in said annular groove adjacent the bottom of said inner sealing cap to limit the downward movement of said outer cap while allowing said outer cap to be rotated independent of said inner sealing cap while said outer cap is down and surrounding said inner sealing cap;
    said engagement of said fingers and ribs providing a means for rotating the inner sealing cap by the rotation of the outer cap, and;
    said inner sealing cap inhibited from rotation by the outer cap when the fingers on said outer cap are rotatably secured in the groove adjacent the bottom of said inside sealing tube;
    said outer cap with the fingers having limited movement upwardly by said upper annular groove on said inner sealing cap;
    and said outer cap with the fingers being limited to downward movement by said groove adjacent said bottom of said inside sealing cap.

6. A safety cap as set forth in claim 1, and;
    said outer cap having two tubular skirt body portions formed of resilient material adapted to be moved longitudinally of said inner sealing cap;
    said inner sealing cap having an annular groove adjacent the bottom of said inner sealing cap to limit downward movement of said outer cap and rotatably secure said outer cap around said inner sealing cap while said inner sealing cap is in sealing position;
    said outer cap having a multiple of spaced fingers interior of one of said tubular skirts adapted to be removably secured in said annular groove adjacent the bottom of said inner sealing cap and rotatable in relation to said inner sealing cap;
    said upper annular groove on said inner sealing cap adapted to limit the upward movement of said outer cap when said fingers are moved from the first slot into said other slot by longitudinal movement of said outer cap in relation to said inner sealing cap.

7. A safety cap as set forth in claim 1;
    the said top of said inner sealing cap having a central portion thereof reduced in thickness thereby providing a relief valve for internal pressure caused by materials within said container;
    and said outer cap providing a means to prevent the spraying of said materials from said container when said relief valve release said pressure within said container.

8. A safety cap as set forth in claim 1;
    said top of said inner sealing cap having a frictionally retained plug sensitive to extraction by internal pressure caused by said material within said container adapted to be separated from said top by said internal pressure to provide a relief valve;

and said outer cap providing a shield to inhibit the material escaping from said container from spraying beyond the area of the outer cap and container.

9. A safety cap for sealing the neck of a container having external screw threads, said safety cap comprising:

an inside sealing cap having a top closure and having internal screw threads engageable with the external threads of the neck of the container;

an external closure cap having a skirt position telescopically engaged upon the internal sealing cap and shiftable longitudinally with respect to the inside sealing cap;

said outside closure cap being normally rotatable with reference to the inner sealing cap;

the inner sealing cap having a respective groove formed at the upper and lower portions thereof;

the expansible skirt of the outer closure cap having internal beads formed at the lower portion thereof engageable with said groove and being shifted longitudinally from an elevated position to a lowered position with reference to the inner sealing cap;

the length of the skirt of the outer closure cap being substantially equal in length to the length of the inner sealing cap;

the said inner sealing cap having a hand grip portion disposed between the spaced external grooves thereof for rotating the inner sealing cap with reference to the external screw threads of the neck of the container;

said outer closure cap, upon being shifted to its elevated position with said inner bead engaged within the groove at the upper portion of the inner sealing cap, exposing the hand grip portion of the inner sealing cap whereby the internal sealing cap may be rotated with reference to the screw threads of the neck portion of the container;

the skirt portion of the outer closure cap, upon being shifted to its lowered position with reference to the inner sealing cap, and with its internal beads engaged in the groove disposed to the lower position of the inner sealing cap being rotatable with reference to the inner sealing cap and thereby preventing a rotary motion of the inner sealing cap, and;

said outer closure cap concealing said hand grip portion when said outer closure cap is in a down position in relation to said inner sealing cap.

10. A safety cap as set forth in claim 9;

said groove at the upper portion of inner sealing cap limiting the upward movement of said outer cap in relation to said inner sealing cap;

and said groove at the lower portion of the inner sealing cap limiting the downward movement of the outer cap in relation to the inner sealing cap.

11. A safety cap as set forth in claim 9;

said top of said inner sealing cap having a central portion thereof reduced in thickness thereby providing a relief valve for internal pressure caused by the materials with said container;

and said outer cap providing a means to prevent the spraying of said materials from said container when said relief valve releases said pressure within said container.

12. A safety cap as set forth in claim 9;

said top of said inner sealing cap having a frictionally retained plug sensitive to extraction by internal pressure caused by said material within said container adapted to be separated from said top by said internal presure to provide a relief valve;

and said outer cap providing a shield to inhibit the material escaping from said container from spraying beyond the area of the outer cap and container.

13. A safety cap for sealing the neck portion of a container which includes external screw threads, said safety cap comprising:

an inner sealing cap having internal screw threads providing a threaded engagement with respect to the external screw threads of the neck portion of the container;

said inside sealing cap having a top closure engageable with the upper end of the neck of the container;

an outside closure cap having a top closure and having a multiple of expansible spaced downward flexible supports for beads and hooks telescopically interfitted upon the outside diameter of the inner sealing cap and being shiftable longitudinally with respect to the inner sealing cap;

said outer closure cap having an outer tubular skirt portion concentric with the said flexible supports and being co-extensive with the inner flexible supports;

said outer skirt portion enclosing the inner sealing cap in both positions of the outer closure cap to prevent gripping of the inner closure cap;

the flexible supports on the outer closure cap, at its lower edge having a series of spaced, upwardly projecting hook elements spaced inwardly from the lower edge of the inner flexible supports;

the lower edge of the inner sealing cap having downwardly facing annular cavities;

said downwardly facing annular cavity having a series of spaced ribs engageable by the spaced hooks of the flexible supports upon shifting the outer closure cap upwardly, whereby the outer closure cap provides a wrench for rotating the inner sealing upon upward shifting of the outer closure cap.

14. A safety cap as set forth in claim 13;

said inner sealing cap having a groove adjacent a bottom of said inner sealing cap;

beads secured to said hooks adapted to be secured in said groove adjacent the bottom of said inner sealing cap and removably retain said hooks in said cavities on said inner sealing cap.

15. A safety cap as set forth in claim 13;

another annular groove adjacent to the upper end of said inner sealing cap;

other beads on said flexible supports adapted to be retained in said other annular groove to retain said outer cap in rotatable relation with said inner sealing caps when said hooks are disengaged from said cavities in said inner sealing cap.

16. A safety sealing cap as set forth in claim 13;

said flexible supports being spaced away from said outer skirt portion to prevent pressure on said skirt portion being applied to said flexible supports.

17. A safety cap as set forth in claim 14;

said top of said inner sealing cap having a central portion thereof reduced in thickness thereby providing a relief valve for internal pressure caused by the materials with said container;

and said outer cap provide a means to prevent the spraying of said materials from said container when said relief valve releases said pressure within said container.

18. A safety cap as set forth in claim 13;

said top of said inner sealing cap having a frictionally retained plug sensitive to extraction by internal pressure caused by said material within said container adapted to be separated from said top by said internal pressure to provide a relief valve;

and said outer cap providing a shield to inhibit the material escaping from said container from spraying beyond the area of the outer cap and container.

References Cited

UNITED STATES PATENTS

| | | | |
|---|---|---|---|
| 3,374,912 | 3/1968 | Velt | 215—9 |
| 3,468,444 | 9/1969 | Martin | 215—9 |

GEORGE T. HALL, Primary Examiner